United States Patent
Balasubramanian et al.

(10) Patent No.: US 12,430,679 B2
(45) Date of Patent: *Sep. 30, 2025

(54) MACHINE LEARNING MODEL FOR CLICK THROUGH RATE PREDICATION USING THREE VECTOR REPRESENTATIONS

(71) Applicant: Maplebear Inc., San Francisco, CA (US)

(72) Inventors: Ramasubramanian Balasubramanian, Jersey City, NJ (US); Saurav Manchanda, Seattle, WA (US)

(73) Assignee: Maplebear Inc., San Francisco, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 18/528,744

(22) Filed: Dec. 4, 2023

(65) Prior Publication Data
US 2024/0104631 A1    Mar. 28, 2024

Related U.S. Application Data

(63) Continuation of application No. 17/513,739, filed on Oct. 28, 2021, now Pat. No. 11,861,677.

(51) Int. Cl.
G06Q 30/00     (2023.01)
G06Q 30/0202   (2023.01)
G06Q 30/0241   (2023.01)
G06Q 30/0601   (2023.01)

(52) U.S. Cl.
CPC ..... *G06Q 30/0631* (2013.01); *G06Q 30/0202* (2013.01); *G06Q 30/0241* (2013.01)

(58) Field of Classification Search
None
See application file for complete search history.

(56) References Cited

U.S. PATENT DOCUMENTS

| | | |
|---|---|---|
| 11,354,349 B1 | 6/2022 | Xu et al. |
| 11,636,291 B1 | 4/2023 | Zuo et al. |
| 2021/0174164 A1 | 6/2021 | Hsieh et al. |
| 2021/0201351 A1 | 7/2021 | Nag et al. |
| 2022/0245161 A1 | 8/2022 | Ahmed et al. |
| 2022/0245706 A1 | 8/2022 | Chaidaroon et al. |
| 2023/0055429 A1 | 2/2023 | Pasternack |
| 2023/0056148 A1 | 2/2023 | Entezari et al. |
| 2023/0117616 A1 | 4/2023 | Zabarauskas et al. |

*Primary Examiner* — Mila Airapetian
(74) *Attorney, Agent, or Firm* — Fenwick & West LLP

(57) ABSTRACT

An online concierge system uses a machine learning click through rate model to select promoted items based on user embeddings, item embeddings, and search query embeddings. Embeddings obtained by an embedding model may be used as inputs to the click through rate model. The embedding model may be trained using different actions to score the strength of a customer interaction with an item. For example, a customer purchasing an item may be a stronger signal than a customer placing an item in a shopping cart, which in turn may be a stronger signal than a customer clicking on an item. The online concierge system generates a ranking of candidate promoted items based on the search query and using the click through rate model. Based on the ranking, the online concierge system displays promoted items along with the organic search results to the customer.

19 Claims, 6 Drawing Sheets

MACHINE LEARNING MODEL FOR CLICK THROUGH RATE PREDICATION USING THREE VECTOR REPRESENTATIONS

CROSS REFERENCE TO RELATED APPLICATIONS

This application is a continuation of U.S. application Ser. No. 17/513,739, filed Oct. 28, 2021, which is incorporated by reference in its entirety.

BACKGROUND

This disclosure relates generally to users placing orders via an online concierge system, and more particularly machine learning methods for improving click through rates for search ads leveraging information from search queries, users, and search ads.

In conventional collaborative filtering systems, the interests of a user are predicted by collecting preference information from many users and finding users similar to the target user. Most such systems use a binary matrix, which captures whether a user has done a particular action, such as clicking on a provided ad. Most conventional systems use a single signal, such as clicking on a provided ad, adding the item to a shopping cart, or purchasing the item.

SUMMARY

An online concierge system may receive a search query from a customer through an ordering interface. The search query includes one or more search terms for identifying one or more items the customer seeks to purchase via the online concierge system. For example, the online concierge system receives a selection of a warehouse for fulfilling an order from the customer and then receives a search query to identify one or more items offered by the selected warehouse.

In addition to presenting relevant items as search results to the search query, the online concierge system presents promoted items to the customer. The online concierge system uses a machine learning click through rate model to select promoted items based on user embeddings, item embeddings, and search query embeddings. The user embeddings and item embeddings may be generated by a machine learning embedding model and provided as inputs to the click through rate model. The embedding model may be trained using different actions to score the strength of a customer interaction with an item. For example, a customer purchasing an item may be a stronger signal than a customer placing an item in a shopping cart, which in turn may be a stronger signal than a customer clicking on an item. The online concierge system generates a ranking of candidate promoted items based on the search query and using the click through rate model. Based on the ranking, the online concierge system displays promoted items along with the organic search results to the customer.

In some embodiments, a method may comprise an online concierge system receiving a search query from a user. The online concierge system may retrieve item embeddings for promoted items, wherein the item embeddings are learned using a machine learning embedding model. The online concierge system may calculate a Hadamard product of search query embeddings for the search query and user embeddings for the user, wherein the user embeddings are learned using the machine learning embedding model. The online concierge system may approximate nearest neighbors from the Hadamard product to the item embeddings for the promoted items. The online concierge system may retrieve a set of candidate promoted items based on the approximating. The online concierge system may rank the set of candidate items using a machine learning click through rate model. The online concierge system may transmit, based on the ranking, a subset of the set of candidate items to a user device for display to the user.

In some embodiments, a machine learning method may comprise an online concierge system obtaining historical data from search logs. The online concierge system may generate search query embeddings for search queries in the search logs. The online concierge system may generate user embeddings for users in the search logs. The online concierge system may generate item embeddings for items in the search logs. The online concierge system may calculate an inner product of the search query embeddings, the user embeddings, and the item embeddings. The online concierge system may execute a learning to rank pairwise loss function to learn the user embeddings and the item embeddings.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
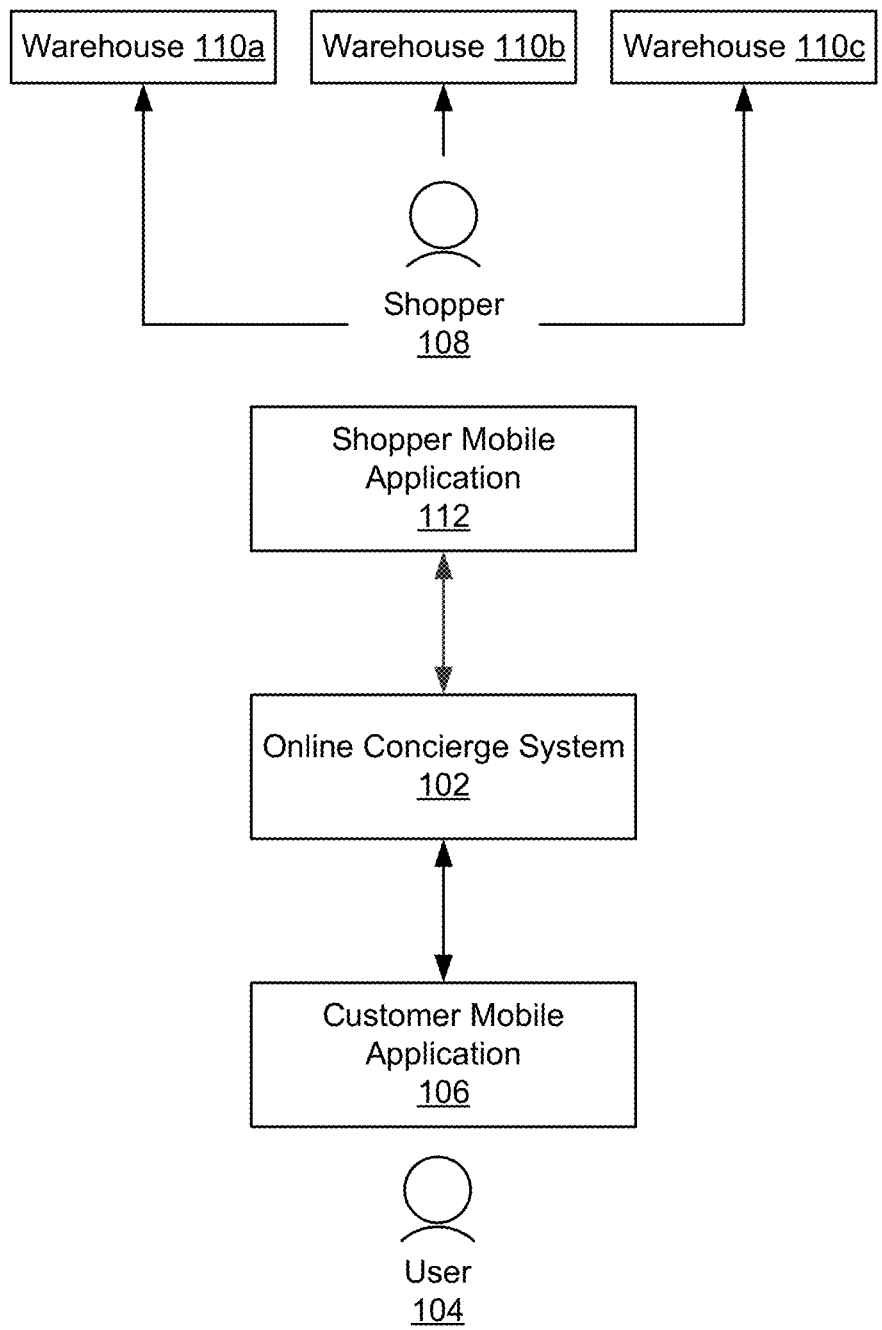
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 on a user device to place the order. The CMA 106 is configured to communicate with the online concierge system 102.

The online concierge system 102 is configured to transmit orders received from users 104 to one or more shoppers 108. A shopper 108 may be a contractor, employee, or other person (or entity) who is enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110*a*, 110*b*, and 110*c* (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
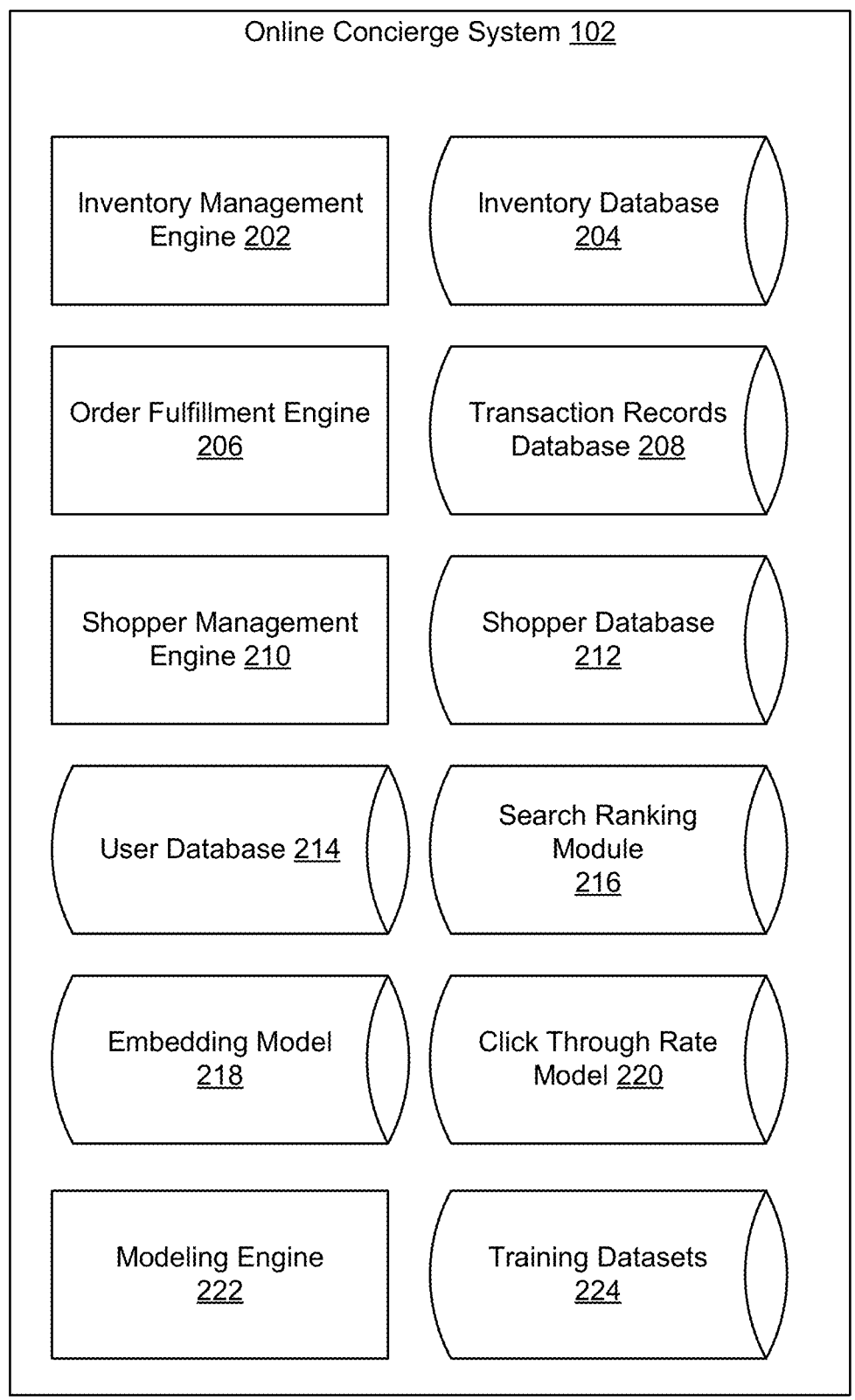
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

Inventory information provided by the inventory management engine 202 may supplement the training datasets 224. Inventory information provided by the inventory management engine 202 may not necessarily include information about the outcome of picking a delivery order associated with the item, whereas the data within the training datasets 224 is structured to include an outcome of picking a delivery order (e.g., if the item in an order was picked or not picked).

The online concierge system 102 includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse to fulfill the order based on one or more parameters, such as the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

As part of fulfilling an order, the order fulfillment engine 206 and/or shopper management engine 210 may access a user database 214 which stores information describing each user. This information could include each user's name, address, gender, shopping preferences, favorite items, stored payment instruments, etc. In various embodiments, the user database 214 includes a user profile for each user, with a user profile corresponding to a user including the user's name, address, gender, items included in one or more prior orders, payment instructions, or other information. A user profile corresponding to a user also includes information uniquely identifying the user.

In various embodiments, the order fulfillment engine 206 generates and maintains an item graph. The item graph identifies connections between pairs of items and attributes of items and between pairs of attributes of items. The item graph comprises a hierarchical taxonomy of nodes. A connection between an item node and an attribute node indicates that the item has the attribute to which the item is connected. The attributes of an item may be specified by information describing the product from a warehouse 110 providing the item or determined by the order fulfillment engine 206 based on information about the item received from the warehouse 110. A connection between an attribute node and an additional attribute node may indicate a parent-child relationship between the attribute nodes. For example, an attribute node for a broad category (e.g., "meat") may be connected to a child attribute node (e.g., "pork") that is a subset of the parent attribute node. In various embodiments, a connection between an attribute node and an additional attribute node may indicate that the attribute and the additional attribute have both occurred in one or more previously received orders for items. For example, the attribute node is connected to the additional attribute node if a previously received order included an item having the attribute and having another item having the additional attribute. Similarly, the attribute node is connected to the additional attribute if a previously received order included an item having both the attribute and having the other attribute.

In various embodiments, the user database 214 also includes one or more accounts and associations between user profiles and accounts. For example, an account corresponds to a physical location (e.g., an address) and is associated with one or more user profiles. A user may identify an account to the online concierge system 102 as well as other user profiles to associate with the account, and the online concierge system 102 stores associations between the account and other user profiles identified by the user. In various embodiments, the account includes a physical location (e.g., an address), delivery instructions for orders identifying the physical location, and other information for the physical location. The order fulfillment engine 206 may leverage associations between different user profiles and the account to retrieve information about previously received orders from multiple users with user profiles associated with the account. This allows the order fulfillment engine 206 to provide a user with a user profile associated with the account with items that other users with other user profiles associated with the account included in previously received orders, providing a user with a user profile associated with the account with additional recommendations for items to include in an order created by the user.

Machine Learning Model

The online concierge system 102 further includes a search ranking module 216, an embedding model 218, a click through rate model 220, a modeling engine 222, and training datasets 224. The click through rate model 220 may comprise a machine-learning click through rate model. The modeling engine 222 uses the training datasets 224 to generate the embedding model 218 and the click through rate model 220. In some embodiments, separate modeling engines may be used to generate the embedding model 218 and the click through rate model 220. The embedding model 218 and the click through rate model 220 can learn from the training datasets 224, rather than follow only explicitly programmed instructions. The inventory management engine 202, order fulfillment engine 206, and/or shopper management engine 210 can use the click through rate model 220 to select promoted items (i.e., items that an advertiser pays to be displayed to a user) for a search query based on a likelihood that the promoted items will result in the customer clicking on the item. User embeddings and item embeddings generated by the embedding model 218 may be used as inputs to the click through rate model 220. The click through rate model 220 may be used to predict the click through rate (pCTR) for promoted items being displayed to or suggested to a user.

The search ranking module 216 is configured to obtain query representations for search terms. The search ranking module 216 may be trained over search conversion logs, and may comprise semantically rich data. The obtained query representations may comprise positive and negative values. The search ranking module 216 may project the query representations to a non-negative space. The search query module 216 may scale the query representations in a range between 0 and 1. Projecting the query representations to a non-negative space may promote interpretability of the obtained query representations. The normalized values are established as the search query embeddings.

The embedding model 218 is configured to obtain user embeddings and item embeddings. The embedding model 218 contains a set of functions generated by the modeling engine 222 from the training datasets 224 that relate the item, search terms, customer, click through data, and/or any other relevant inputs, to the user embeddings and item embeddings. The embedding model 218 may be configured to receive as inputs previous conversion data for items displayed to customers who entered search terms. The conversion data may comprise a hierarchy of ranked signals for a user, such as whether the customer clicked on the item, whether the customer placed the item in a shopping cart, and whether the customer purchased the item. The embedding model 218 may be adapted to receive any information that the modeling engine 222 identifies as indicators affecting the likelihood of a conversion for search terms. The embedding model 218 may receive information about an item-query pair, such as an item in a delivery order and a corresponding search query that resulted in a conversion. Items stored in the inventory database 204 may be identified by item identifiers. In various embodiments, various attributes, some of which are specific to the warehouse (e.g., a time that the item was last found in the warehouse, a time that the item was last not found in the warehouse, the rate at which the item is found, the popularity of the item), may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. Based on the identifier(s), the online concierge system 102 can extract information about the item and/or warehouse from the inventory database 204 and/or warehouse database and provide this extracted information as inputs to the click through rate model 220.

The click through rate model 220 contains a set of functions generated by the modeling engine 222 from the training datasets 224 that relate the item, search terms, customer, click through data, and/or any other relevant inputs, to the probability that the items presented for a search query will result in the customer clicking on the item. The click through rate model 220 may select promoted items based on user embeddings, item embeddings, and search query embeddings. Thus, for a given search query and customer, the click through rate model 220 outputs a ranking of items that may result in the customer clicking on the item. In some embodiments, the probability output by the click through rate model 220 includes a confidence score. The confidence score may be the error or uncertainty score of the output click probability and may be calculated using any standard statistical error measurement. In some examples, the confidence score is based in part on whether the click prediction was accurate for previous search queries (e.g., if the items displayed in response to search query were predicted to lead to a click but did not result in a click, or predicted to not lead to a click but did result in a click). The set of functions of the click through rate model 220 may be updated and adapted following retraining with new training datasets 224. The click through rate model 220 may be any machine learning model, such as a neural network, boosted tree, gradient boosted tree, or random forest model. In some examples, the click through rate model 220 is generated from XGBoost algorithm.

The click through rate model 220 may use a retrieval plus ranking framework. It may be burdensome to rank all possible promoted items. Thus, the click through rate model may be configured to retrieve a set of relevant results. The click through rate model 220 may retrieve search query embeddings from the search ranking module 216. The click through rate model 220 may use the search query embeddings, as well as user embeddings and item embeddings, to perform a nearest known neighbor search to retrieve the set of relevant results. The click through rate model 220 may use a library, such as Faiss library, to retrieve the relevant results. The click through rate model 220 may then rank the set of relevant results. The ranked items generated by the click through rate model 220 may be used to display promoted items to the user 104, as described in further detail below.

The training datasets 224 relate a variety of different factors to the outcomes of previous search queries. The training datasets 224 may comprise triplets of a user, search terms, and item. Each triplet in the training datasets 224 includes the outcome of a previous search query (e.g., if the item in a triplet was clicked on, added to a shopping cart, or purchased). The search query characteristics may be determined by the click through rate model 220 to be statistically significant factors predictive of the pCTR for a promoted item. For different users and different search queries, the item characteristics that are predictors of pCTR may be different. For each promoted item, the click through rate model 220 may weight these factors differently, where the weights are a result of a "learning" or training process on the training datasets 224. The training datasets 224 are very large datasets taken across a wide cross section of search queries, customers, items, warehouses, delivery orders, times, and item characteristics. The training datasets 224 are large enough to provide a mapping from a search query to a pCTR for a promoted item.

Machine Learning Factors

The training datasets 224 include associations between search terms entered by a customer and click through data for items presented to the customer. The data in the training datasets 224 is labeled based on whether or not, for search terms entered by a customer, displayed items resulted in a click or a conversion to produce a labeled set of training data. The online concierge system 102 trains the embedding model 218 and the click through rate model 220 using the set of training data. The system applies the model to future search queries to determine a probability of whether a promoted item will lead to a customer clicking on the item.

The training datasets 224 may include a time associated with previous delivery orders. In some embodiments, the training datasets 224 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 224 include a day of the week previous delivery orders were placed. The day of the week may impact item availability, since popular shopping days may have reduced inventory of items or restocking shipments may be received on particular days. In some embodiments, training datasets 224 include a time interval since an item was previously picked in a previous delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 224 include a time interval since an item was not found in a previous delivery order. If there has been a short time interval since an item was not found, this may indicate that there is a low probability that the item is available in subsequent delivery orders. And conversely, if there has been a long time interval since an item was not found, this may indicate that the item may have been restocked and is available for subsequent delivery orders.

The training datasets 224 include item characteristics. In some embodiments, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs."

The training datasets 224 may include additional item characteristics that relate to search queries entered by a user and can therefore be used to build the click through rate model 220 relating the search queries to promoted items that are predicted to have a high pCTR. The training datasets 224 may be periodically updated with recent search query and conversion data. Following updating of the training datasets 224, a modeling engine 222 may retrain the model with the updated training datasets 224 and produce a new click through rate model 220.

Customer Mobile Application

Figure 3A:
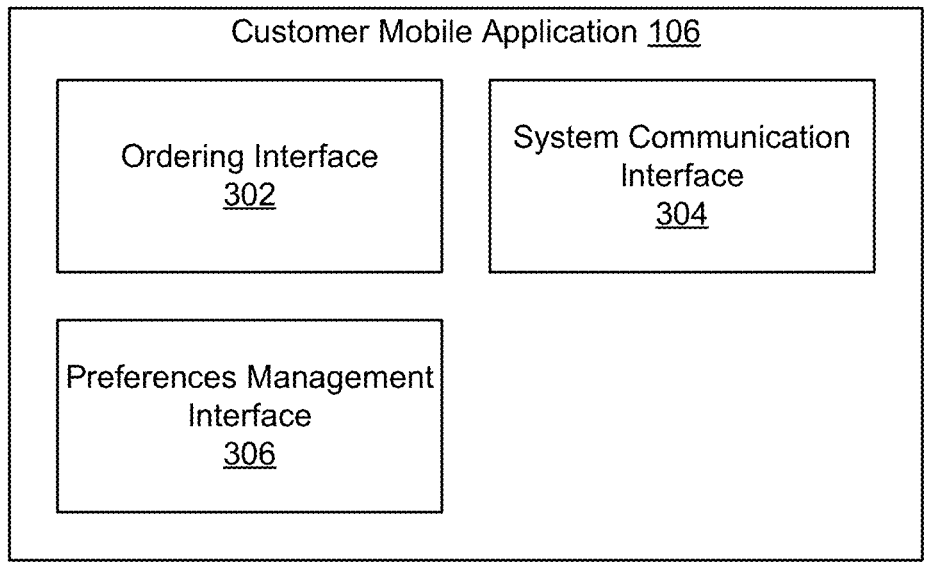
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the customer 104 can browse through and select products and place an order. The ordering interface 302 provides a search query interface for the customer to enter a search query. The ordering interface 302 may display promoted items selected by a click through rate model, such as the click through rate model 220 described with reference to FIG. 2. The customer may select an item to order a specific item. The CMA 106 also includes a system communication interface 304 which, among other functions, receives inventory information from the online shopping concierge system 102 and transmits order information to the system 102. The CMA 106 also includes a preferences management interface 306 which allows the customer 104 to manage basic information associated with his/her account, such as his/her home address and payment instruments. The preferences management interface 306 may also allow the customer to manage other details such as his/her favorite or preferred warehouses 110, preferred delivery times, special instructions for delivery, etc.

Shopper Mobile Application

Figure 3B:
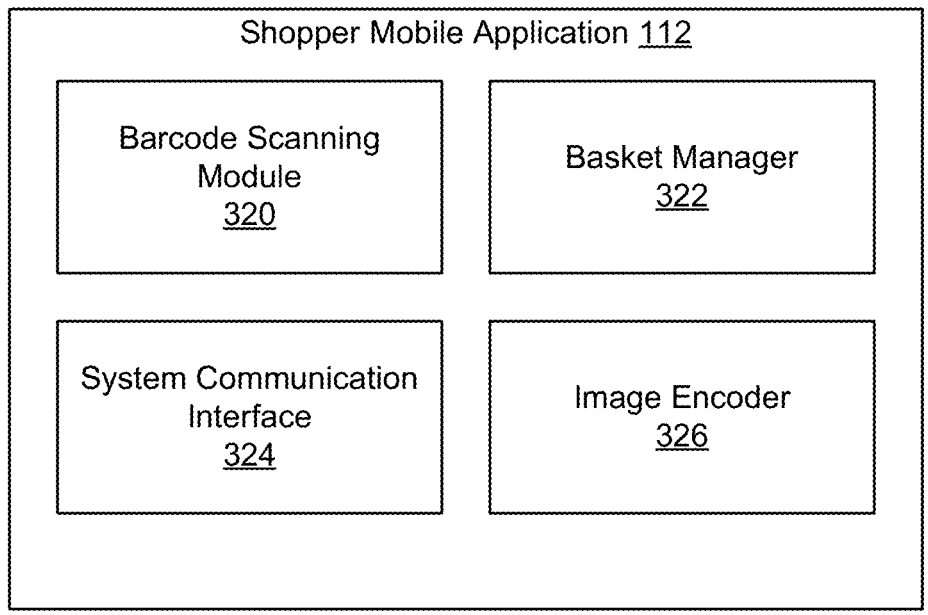
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Training the Machine Learning Model

Figure 4:
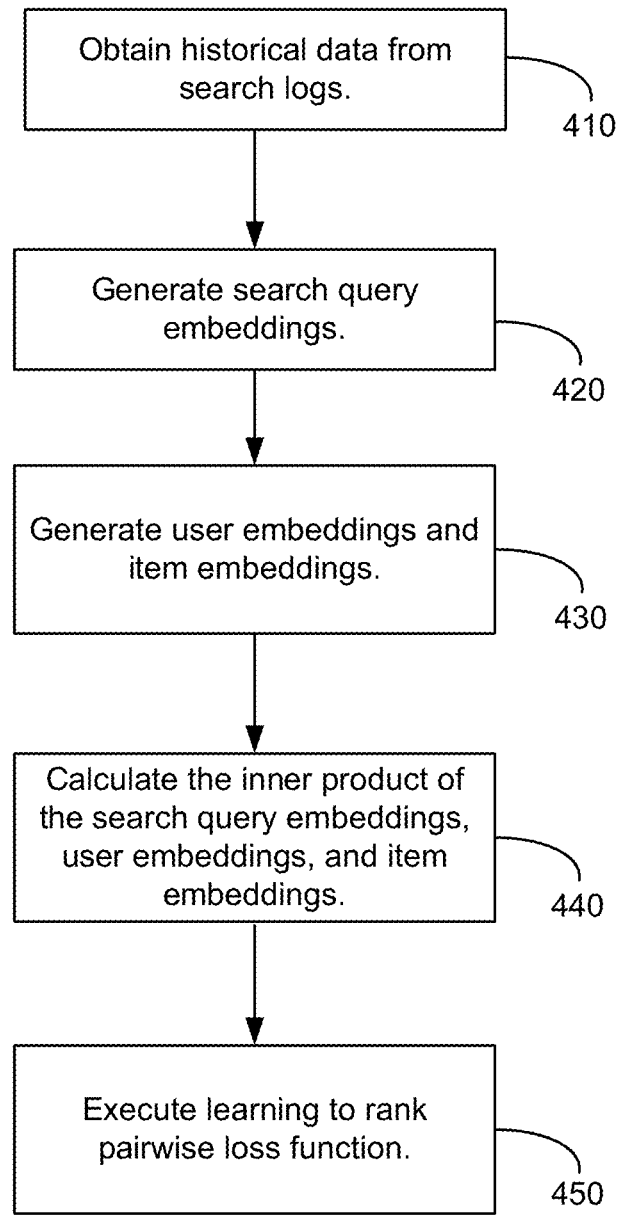
FIG. 4 is a flowchart of a process for training a machine learning embedding model, according to one embodiment.

FIG. 4 illustrates an example process 400 for training a machine learning embedding model, in accordance with an embodiment. The online concierge system obtains 410 historical data from search logs. The historical data may comprise triplets including a search query, a user, and displayed items. The displayed items in the historical data may comprise organic search results as well as promoted items. The triplets may be labeled with whether the user clicked on the item, added the item to a shopping cart, or purchased the item.

The online concierge system generates 420 search query embeddings for search queries. The search ranking module generates a query representation for the search query. The query representation may comprise a d-dimensional vector having both positive and negative values. The search ranking module projects the d-dimensional vector to a non-negative space by scaling the query representation to a 0-1 range. The normalized values are established as the search query embeddings. The search query embeddings may be treated as known values once received from the search ranking module. Thus, the search query embeddings may be fixed while the embedding model learns the user embeddings and item embeddings during the training process.

The embedding model generates 430 embeddings for the user and the displayed item. The embeddings may be initialized randomly. The embeddings may be learned using forward and/or back propagation.

The embedding model calculates 440 the inner product of the query embeddings, the user embeddings, and the item embeddings. The user embeddings and the item embeddings may be rotated in the latent space of the query embeddings, because the embedding model may leverage the pre-computed fixed query embeddings. The embedding model executes an activation function of the inner product. The activation function may be a sigmoid function. The sigmoid function outputs a score for the triplet ranging between 0 and 1.

The embedding model executes 450 a learning to rank pairwise loss function. The pairwise loss function seeks to minimize inversions from ground truth. For example, for a given user and search query, the pairwise loss function seeks to obtain user embeddings and item embeddings such that the inner product of the user embeddings, item embeddings, and search term embeddings for an item that the user purchased is greater than the inner product of the user embeddings, item embeddings, and search term embeddings for an item that the user placed in a shopping cart but did not purchase. Similarly, the pairwise loss function seeks to obtain user embeddings and item embeddings such that the inner product of the user embeddings, item embeddings, and search term embeddings for an item that the user placed in a shopping cart but did not purchase is greater than the inner product of the user embeddings, item embeddings, and search term embeddings for an item that the clicked on but did not place in a shopping cart. The pairwise loss function may evaluate all pairs of items in the training data and calculate the user embeddings and item embeddings to minimize the number of inversions from the ground truth labels.

Figure 5:
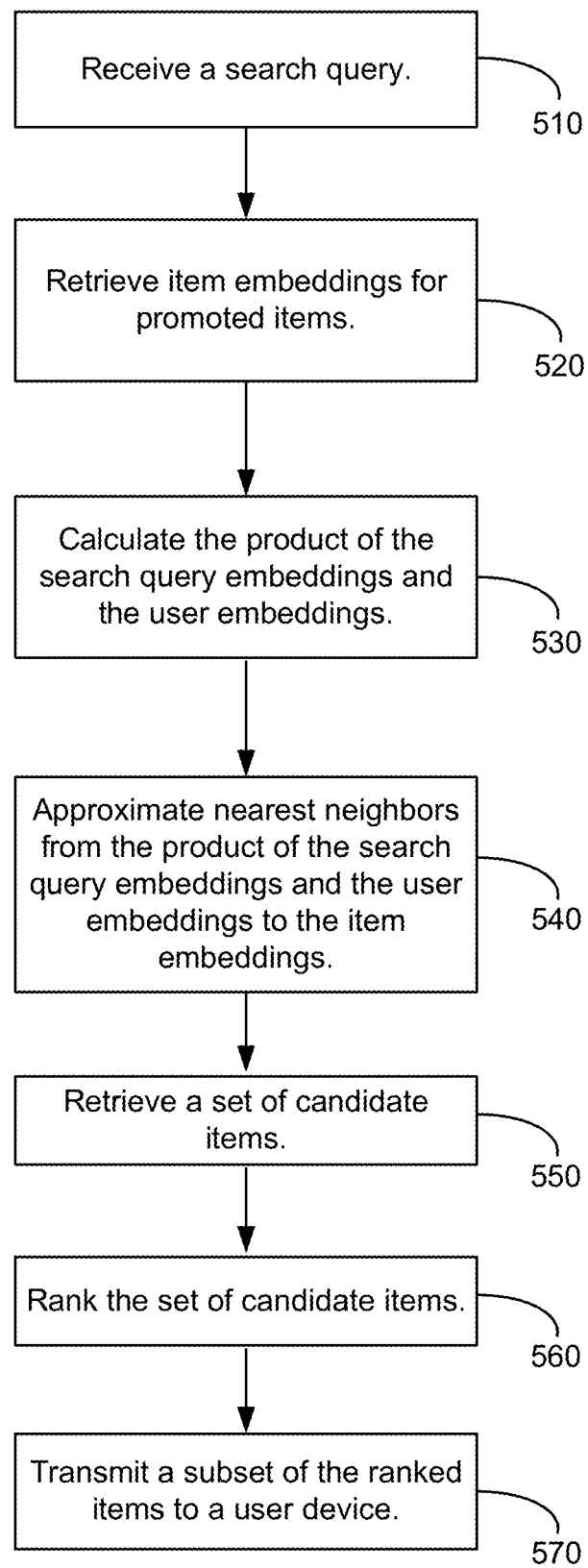
FIG. 5 is flowchart of a process for selecting promoted items using a machine learning model for predicting click through rate, according to one embodiment.

FIG. 5 illustrates an example process for providing relevant promoted items for a search query using a click through rate model, in accordance with an embodiment. An online concierge system receives 510 search query. For example, a user may type in a search query to a user interface, such as the customer mobile application described with reference to FIG. 3A.

The online concierge system retrieves 520 the item embeddings for promoted items. The online concierge system may retrieve the item embeddings for all available promoted items. The item embeddings may be generated during the training process for the embedding model 218 as described with reference to FIGS. 2 and 4.

The online concierge system calculates 530 the Hadamard product of the search query embeddings and the user embeddings. The search query embeddings may be retrieved from the search query module 216, and the user embeddings may be generated during the training process for the embedding model 218 as described with reference to FIGS. 2 and 4. The Hadamard product, also referred to as an element-wise product, is a binary operation that takes two matrices of the same dimensions and produces another matrix of the same dimension as the operands, where each element i, j is the product of elements i, j of the original two matrices. The product may represent a joint representation of the user and the search query.

The online concierge system 540 approximates nearest neighbors from the product of the search query embeddings and the user embeddings to the item embeddings for each promoted item. The online concierge system may use a library, such as Faiss library, to select the nearest neighbors.

The online concierge system retrieves 550 a set of candidate promoted items based on the approximating. The online concierge system may retrieve the promoted items that are approximated to have item embeddings which are nearest to the product of the search query embeddings and the user embeddings. The set of candidate promoted items may be a subset of all available promoted items. Retrieving a subset of all available promoted items may decrease the processing requirements and latency compared to ranking all available promoted items.

The online concierge system ranks 560 the set of candidate promoted items retrieved by the nearest neighbor approximation in step 540. The online concierge system uses the user embeddings and item embeddings as inputs to a click through rate model to perform the ranking. The click through rate model may use the embeddings as features to generate a score for each of the candidate promoted items. The score may comprise the probability of the user clicking on the promoted item. In some embodiments, the click through rate model may calculate the effective cost per mille (eCPM) for each of the candidate promoted items. The eCPM may be calculated by multiplying a bid from an advertiser by the probability of a user taking an action on the displayed promoted item (e.g., clicking on or purchasing the displayed promoted item). The online concierge system may rank the candidate promoted items based on the eCPM for each candidate promoted item.

The online concierge system transmits 570 a subset of the ranked promoted items to a user device for display to a user. In some embodiments, the online concierge system may transmit a fixed number of promoted items, such as 1, 3, 10, or any other suitable number. In some embodiments, the online concierge system may transmit all promoted items above a threshold probability of click or above a threshold eCPM. The online concierge system may also transmit organic search results for the search query. The promoted items may be displayed simultaneously with the organic search results. In some embodiments, the promoted items may be displayed first in a list of search results. In some embodiments, the promoted items may be interspersed throughout the organic search results. The online concierge system may retrain the embedding model or the click through rate model after receiving new triplets from users interacting with promoted items or organic search results transmitted to the user.

Figure 6:
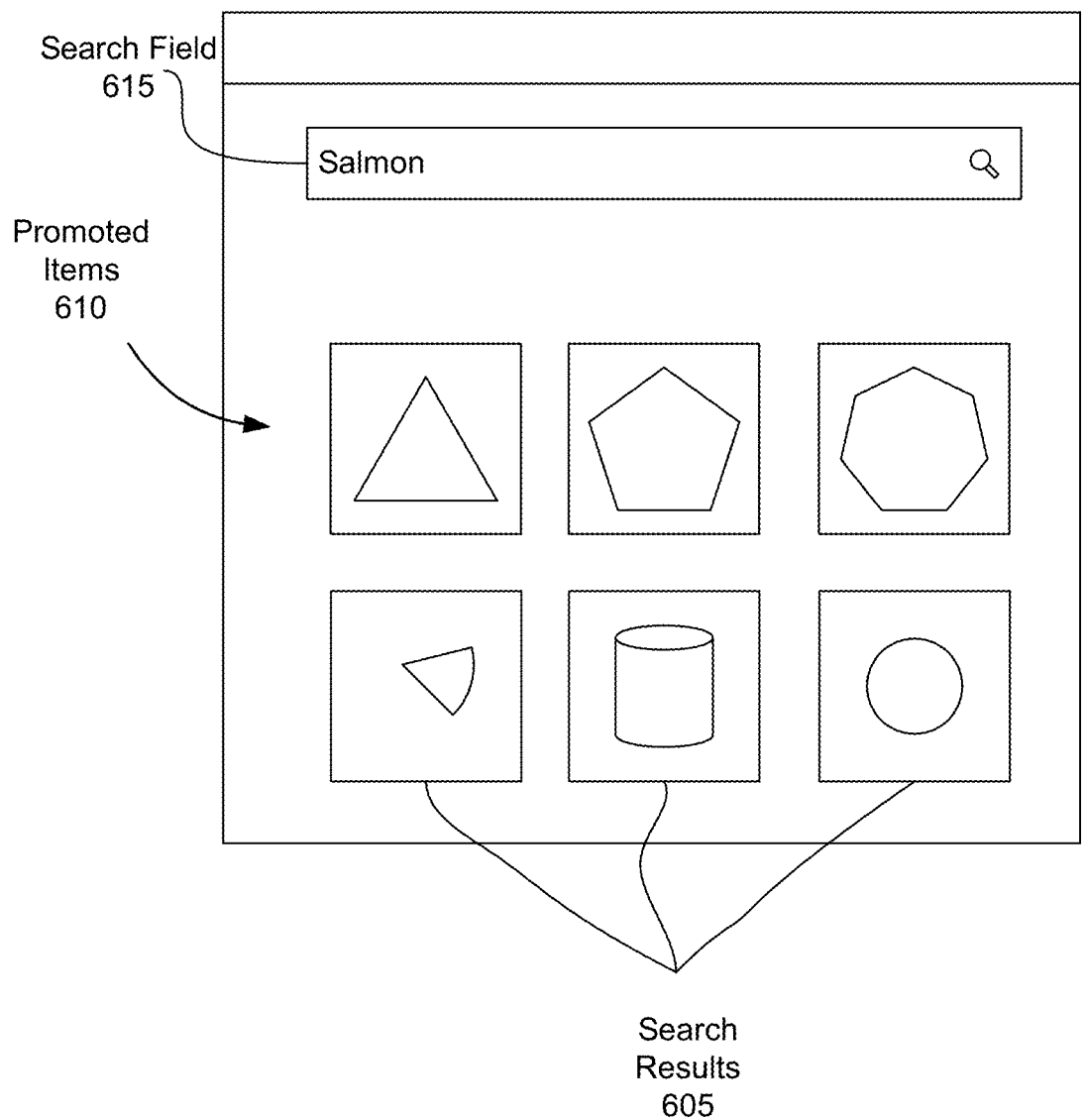
FIG. 6 is an example interface including promoted items and organic search results, according to one embodiment.

FIG. 6 illustrates an example interface 600 displayed by a customer mobile application 106 including promoted items. In the example of FIG. 6, the interface 600 includes search results 605 for a search query for "salmon." Additionally, the interface 600 includes promoted items 610 which are displayed on the interface 600. The promoted items 610 may be selected by the click through rate model 220, as described with respect to FIGS. 2, 4, and 5. The promoted items 610 may be selected based on embeddings for the user, embeddings for the search query, and embeddings for the promoted items.

Although described primarily with reference to promoted items, those skilled in the art will recognize that the click through rate model and the processes described herein may similarly be applied to ranking organic search results.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    at an online concierge system comprising one or more processors and one or more computer-readable media:
    receiving, by the online concierge system, a search query from a user;
    retrieving, by the online concierge system, offering embeddings for offerings, wherein the offering embeddings are generated using a machine learning embedding model, wherein an offering is offered by the online concierge system to the user;
    calculating, by the online concierge system, a Hadamard product of a search query embedding for the search query and a user embedding for the user, wherein the user embedding is generated using the machine learning embedding model;
    selecting, by the online concierge system, a set of offering embeddings based on distances of the offering embeddings in the set from the Hadamard product;

retrieving, by the online concierge system, a set of candidate offerings corresponding to the set of offering embeddings;

ranking, by the online concierge system, the set of candidate offerings using a second machine learning model; and transmitting, by the online concierge system and based on the ranking, a subset of the set of candidate offerings to a user device for display to the user.

2. The method of claim 1, further comprising training the machine learning embedding model, wherein training the machine learning embedding model comprises:

using historical data from a search log comprising triplets, each triplet including a search query, a user, and an item, wherein each triplet is labeled based on an action performed by the user on the item.

3. The method of claim 1, wherein the user embeddings and the offering embeddings are learned by calculating an inner product of the search query embeddings, the user embeddings, and offering embeddings, and performing a learning to rank pairwise loss function.

4. The method of claim 1, further comprising calculating, by the online concierge system, a predicted click through rate for each of the subset of the set of candidate offerings.

5. The method of claim 1 further comprising calculating, by the online concierge system, an effective cost per mile for each of the subset of the set of candidate offerings.

6. The method of claim 1, wherein calculating the product comprises calculating a Hadamard product of the search query embeddings and the user embeddings.

7. The method of claim 1, further comprising retrieving the search query embeddings from a search ranking module, wherein the search query embeddings remain fixed while the user embeddings and the offering embeddings are learned by the machine learning embedding model.

8. The method of claim 1, wherein the set of candidate offerings comprises one or more items offered by the online concierge system.

9. The method of claim 1, further comprising rotating the user embeddings and the offering embeddings into a latent space of the search queries.

10. A method comprising:

at an online concierge system comprising one or more processors and one or more computer-readable media:

receiving, by the online concierge system, a search query from a user;

retrieving, by the online concierge system, offering embeddings for offerings, wherein the offering embeddings are generated using a machine learning embedding model, wherein an offering is offered by the online concierge system to the user;

calculating, by the online concierge system, a matrix operation product of a search query embedding for the search query and a user embedding for the user, wherein the user embedding is generated using the machine learning embedding model;

selecting, by the online concierge system, a set of offering embeddings based on distances of the offering embeddings in the set from the matrix operation product;

retrieving, by the online concierge system, a set of candidate offerings corresponding to the set of offering embeddings;

ranking, by the online concierge system, the set of candidate offerings using a second machine learning model; and transmitting, by the online concierge system and based on the ranking, a subset of the set of candidate offerings to a user device for display to the user.

11. The method of claim 10, further comprising training the machine learning embedding model, wherein training the machine learning embedding model comprises:

using historical data from a search log comprising triplets, each triplet including a search query, a user, and an item, wherein each triplet is labeled based on an action performed by the user on the item.

12. The method of claim 10, wherein the user embeddings and the offering embeddings are learned by calculating an inner product of the search query embeddings, the user embeddings, and offering embeddings, and performing a learning to rank pairwise loss function.

13. The method of claim 10, further comprising calculating, by the online concierge system, a predicted click through rate for each of the subset of the set of candidate offerings.

14. The method of claim 10 further comprising calculating, by the online concierge system, an effective cost per mile for each of the subset of the set of candidate offerings.

15. The method of claim 10, wherein calculating the product comprises calculating a Hadamard product of the search query embeddings and the user embeddings.

16. The method of claim 10, further comprising retrieving the search query embeddings from a search ranking module, wherein the search query embeddings remain fixed while the user embeddings and the offering embeddings are learned by the machine learning embedding model.

17. The method of claim 10, wherein the set of candidate offerings comprises one or more items offered by the online concierge system.

18. The method of claim 10, further comprising rotating the user embeddings and the offering embeddings into a latent space of the search queries.

19. The method of claim 10, wherein the matrix operation product comprises a Hadamard product.

\* \* \* \* \*